United States Patent
Nakagaki et al.

(10) Patent No.: US 11,138,679 B2
(45) Date of Patent: Oct. 5, 2021

(54) MANAGEMENT METHOD AND MANAGEMENT APPARATUS

(71) Applicant: KYOCERA Corporation, Kyoto (JP)

(72) Inventors: Nodoka Nakagaki, Yokohama (JP); Taku Nakayama, Yamato (JP); Kenta Okino, Yokohama (JP); Kei Iwata, Kawasaki (JP); Takashi Furukawa, Yokohama (JP); Naohisa Yoshitani, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 139 days.

(21) Appl. No.: 16/617,500

(22) PCT Filed: May 23, 2018

(86) PCT No.: PCT/JP2018/019743
§ 371 (c)(1),
(2) Date: Nov. 27, 2019

(87) PCT Pub. No.: WO2018/221330
PCT Pub. Date: Dec. 6, 2018

(65) Prior Publication Data
US 2020/0184577 A1 Jun. 11, 2020

(30) Foreign Application Priority Data
May 29, 2017 (JP) .............................. JP2017-105971

(51) Int. Cl.
*G06Q 50/06* (2012.01)
*G06Q 10/06* (2012.01)
(Continued)

(52) U.S. Cl.
CPC ....... *G06Q 50/06* (2013.01); *G06Q 10/06315* (2013.01); *H02J 3/12* (2013.01); *H02J 13/00* (2013.01)

(58) Field of Classification Search
CPC ..... G06Q 50/06; G06Q 10/06315; H02J 3/12; H02J 13/00; H02J 2310/60; H02J 2310/52;
(Continued)

(56) References Cited

U.S. PATENT DOCUMENTS 5,946,923 A * 9/1999 Samukawa ............ B60H 1/008
62/133
9,283,862 B2 * 3/2016 Bridges ................... B60L 53/63
(Continued)

FOREIGN PATENT DOCUMENTS

JP 2013-240154 A 11/2013
JP 2016-136795 A 7/2016
(Continued)

*Primary Examiner* — Ramesh B Patel
(74) *Attorney, Agent, or Firm* — Hauptman Ham, LLP

(57) ABSTRACT

A management method includes a step A of estimating, for each of the plurality of entities, an error pattern related to a prediction error occurring when a power consumption amount in a future period is predicted; and a step B of determining a group of entities from among the plurality of entities based on the error pattern, wherein the group is a destination of a power reduction request for reducing the power consumption amount. The step A includes a step of estimating whether the prediction error is a positive error or a negative error. The step B includes a step of determining the group such that a total prediction error of the group is minimized, by combining an entity of which the prediction error is estimated to be a positive error and an entity of which the prediction error is estimated to be a negative error.

12 Claims, 10 Drawing Sheets

(51) Int. Cl.
*H02J 3/12* (2006.01)
*H02J 13/00* (2006.01)

(58) Field of Classification Search
CPC ........... H02J 3/14; H02J 3/00; Y02B 70/3225; Y04S 20/222
See application file for complete search history.

(56) References Cited

U.S. PATENT DOCUMENTS

| | | | |
|---|---|---|---|
| 10,742,438 B2* | 8/2020 | Cho | H04L 41/0853 |
| 2013/0338842 A1* | 12/2013 | Inoue | G06Q 50/06 700/291 |
| 2015/0160040 A1* | 6/2015 | Furukawa | H02J 13/00028 340/870.09 |
| 2016/0276832 A1* | 9/2016 | Kawai | H02J 3/14 |
| 2017/0052554 A1* | 2/2017 | Fukaura | G05F 1/66 |
| 2017/0103483 A1* | 4/2017 | Drees | G05B 13/021 |
| 2019/0147465 A1* | 5/2019 | Okamoto | G06Q 50/06 705/7.31 |
| 2020/0348662 A1* | 11/2020 | Cella | G05B 23/0289 |

FOREIGN PATENT DOCUMENTS

| | | |
|---|---|---|
| JP | 2016-217598 A | 12/2016 |
| JP | 2017-41941 A | 2/2017 |
| JP | 2017-228148 A | 12/2017 |

\* cited by examiner

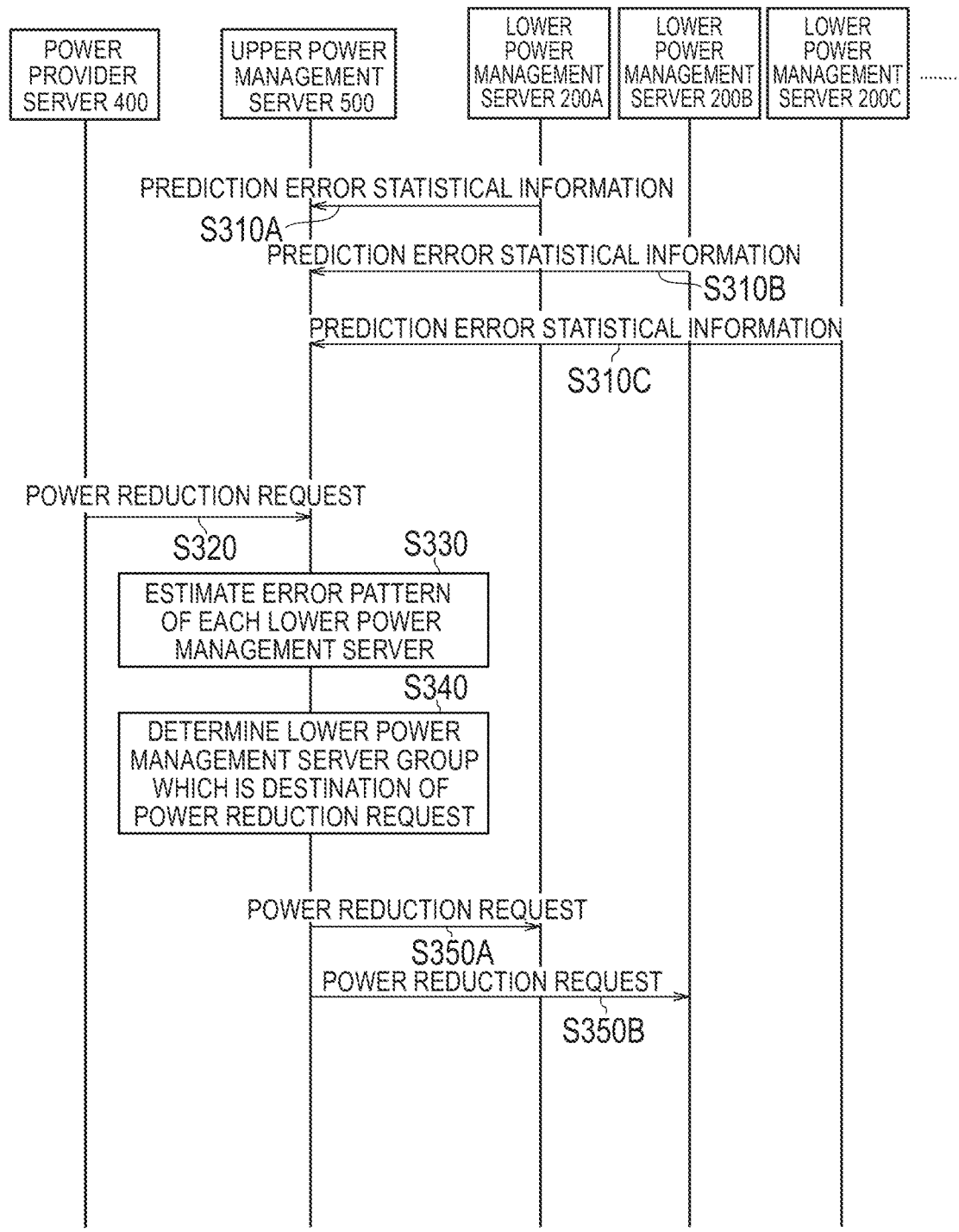

MANAGEMENT METHOD AND MANAGEMENT APPARATUS

RELATED APPLICATIONS

The present application is a National Phase of International Application No. PCT/JP2018/019743, filed May 23, 2018, and claims priority based on Japanese Patent Application No. 2017-105971, filed May 29, 2017.

TECHNICAL FIELD

The present invention relates to a management method and a management apparatus which is used in a power management system.

BACKGROUND ART

In recent years, DR (Demand Response) is received a lot of attention. The DR is a mechanism in which a power provider which provides power requests a reduction in power consumption amount to reduce the power consumption amount in a facility (consumer's facility) connected to a power grid so as to take a balance between demand and supply of power.

In such a DR, a management apparatus may be used to manage a plurality of facilities. When receiving a power reduction request from the power provider, the management apparatus determines a facility capable of receiving the power reduction request from the plurality of facilities thereof and a power consumption amount to be reduced, and requests a reduction of the power consumption amount from the facility. In order to appropriately perform such a process, the management apparatus needs to predict the power consumption amount of the facility during a future period when the reduction of the power consumption amount is requested.

As a successful condition of the DR, a difference between a power reduction amount requested from the power provider and an actually-achieved power reduction amount is required to fall within a predetermined value. Therefore, in order to increase a success rate of the DR, the prediction accuracy of the power consumption amount is desirably increased.

As a method of reducing a risk of missing the prediction of a power consumption amount, there is proposed a method of specifying an equipment satisfying an unstable condition on the basis of DR score information of each equipment (air conditioner), excluding the equipment or applying a small weight so as to predict a power consumption amount (see Patent Literature 1).

CITATION LIST

Patent Literature

Patent Literature 1: Japanese application publication No. 2016-217598

SUMMARY OF INVENTION

A management method according to one aspect is used in a management apparatus, the management apparatus managing a plurality of entities which use or manage power. The management method comprises a step A of estimating, for each of the plurality of entities, an error pattern related to a prediction error occurring when a power consumption amount in a future period is predicted; and a step B of determining a group of entities from among the plurality of entities based on the error pattern, wherein the group is a destination of a power reduction request for reducing the power consumption amount. The step A includes a step of estimating whether the prediction error is a positive error or a negative error. The step B includes a step of determining the group such that a total prediction error of the group is minimized, by combining an entity of which the prediction error is estimated to be a positive error and an entity of which the prediction error is estimated to be a negative error.

BRIEF DESCRIPTION OF DRAWINGS

FIG. 11 is a diagram illustrating a management method according to the third embodiment.

DESCRIPTION OF EMBODIMENTS

Embodiments will be described with reference to the drawings. The same or similar portions in the description of the following drawings will be attached with the same or similar symbol.

[Outline of Embodiments]

Since there is a limit to improving a prediction accuracy of a power consumption amount described in the related art, it is considered inevitable that an error (prediction error) is generated in the actual power consumption amount. Therefore, there is a limit to the approach of increasing a success rate of the DR by increasing of the prediction accuracy of the power consumption amount.

In the following, the description will be given about a management method and a management apparatus which enables the increasing of the success rate of the DR while allowing a prediction error of the power consumption amount.

The management methods according to first to third embodiments are used in the management apparatus which manages a plurality of entities which use or manage power. The management method comprises a step A of estimating, for each of the plurality of entities, an error pattern related to a prediction error occurring when a power consumption amount in a future period is predicted; and a step B of determining a group of entities from among the plurality of entities based on the error pattern, wherein the group is a destination of a power reduction request for reducing the power consumption amount. The step A includes a step of estimating whether the prediction error is a positive error or a negative error. The step B includes a step of determining the group such that a total prediction error of the group is minimized, by combining an entity of which the prediction error is estimated to be a positive error and an entity of which the prediction error is estimated to be a negative error.

According to such a management method, the entity of which the prediction error is estimated to be a positive error and the entity of which the prediction error is estimated to be a negative prediction error are combined, so that the positive error and the negative error can be weakened. In other words, according to such a management method, a total prediction error of the group can be made small by adding the positive error and the negative error together. Therefore, according to such a management method, a total prediction error of the group can be minimized while allowing the prediction error, so that the success rate of the DR can be increased.

In the first and second embodiments, the management apparatus manages a plurality of facilities as the plurality of entities. In the third embodiment, the management apparatus is an upper management apparatus which manages a plurality of lower management apparatuses as the plurality of entities.

First Embodiment (Power Management System)

Figure 1:
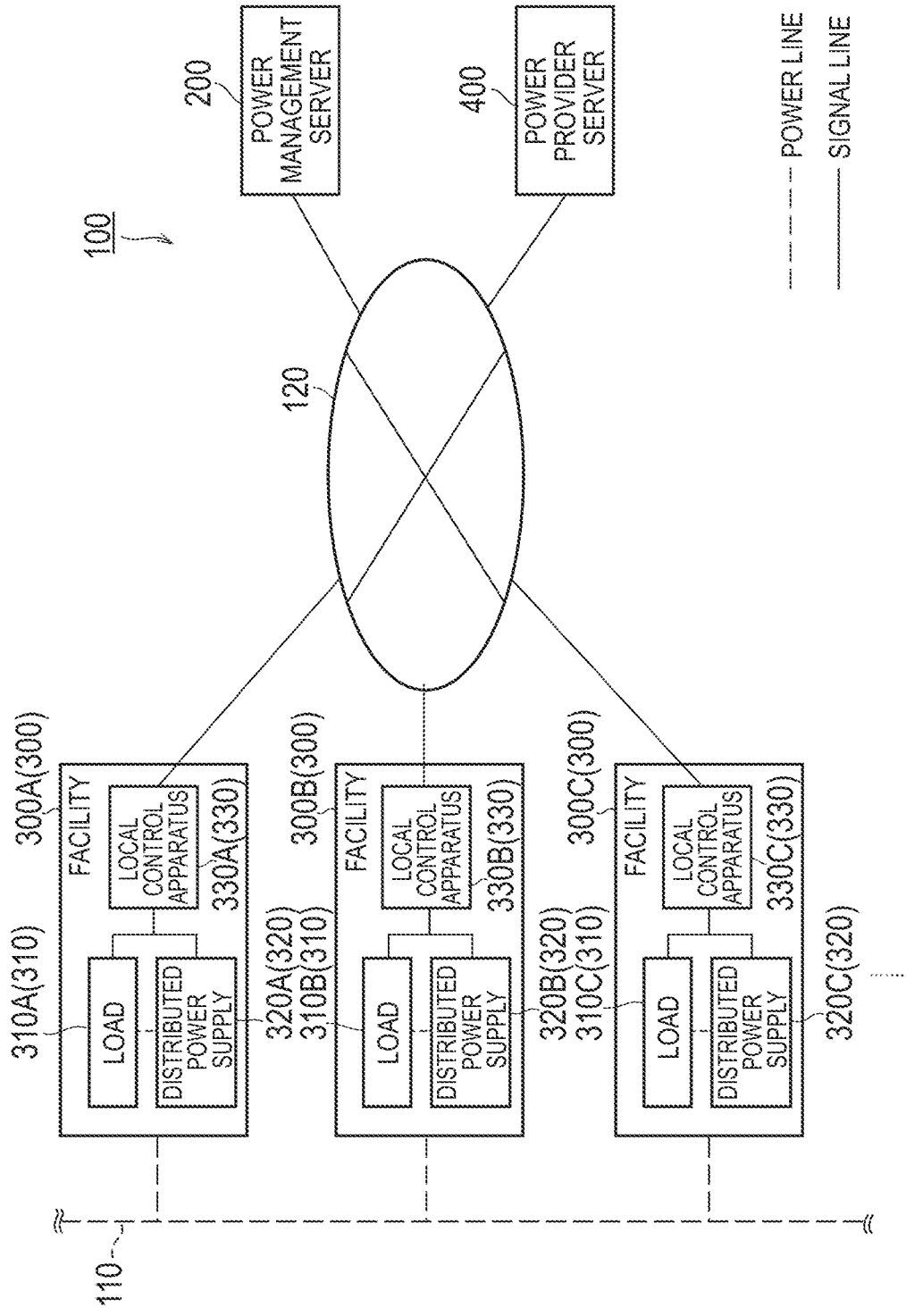
FIG. 1 is a diagram illustrating a configuration of a power management system according to first and second embodiments.

The configuration of a power management system according to the first embodiment will be described. As illustrated in FIG. 1, a power management system 100 includes a power management server 200, a plurality of facilities 300, and a power provider server 400. In FIG. 1, facilities 300A, 300B, 300C, and so on are illustrated as the plurality of facilities 300. Each facility 300 is connected to a power grid 110. In the following, a power flow from the power grid 110 to the facility 300 will be called a stream. A power flow from the facility 300 to the power grid 110 will be called a reverse stream.

The power management server 200, the facility 300, and the power provider server 400 are connected to a network 120. The network 120 provides a line between the power management server 200 and the facility 300, and a line between the power management server 200 and the power provider server 400. The network 120 is, for example, the Internet. The network 120 may provide a dedicated line such as VPN (Virtual Private Network).

The power management server 200 is a server which is managed by an aggregator. The aggregator is a company which collects power reduction amounts from a bundle of the plurality of facilities 300. In the first embodiment, the power management server 200 is an example of the management apparatus which manages the plurality of facilities 300. The power management server 200 may be called an aggregator DRAS (Demand Response Automation Server).

The facility 300 is a store such as a supermarket and a corner store. The facility 300 may be a house, a building, or a factory. The facility 300 includes a load 310, a distributed power supply 320, and a local control apparatus 330. The load 310 is an equipment which operates using power. The load 310 may be, for example, an air conditioner or a lighting equipment. The distributed power supply 320 is an equipment having at least any one of a function of outputting power and a function of accumulating power. The distributed power supply 320 may be, for example, a solar cell, a fuel cell, or a storage battery. The local control apparatus 330 is an apparatus (EMS; Energy Management System) which manages power of the facility 300. The local control apparatus 330 may control the operation state of the load 310, or control the operation state of the distributed power supply 320 installed in the facility 300. The local control apparatus 330 may periodically transmit the power consumption amount (measurement value) of the corresponding facility 300 to the power management server 200. The power consumption amount of the facility 300 may be measured by a smart meter (not illustrated) installed in the facility 300.

The power provider server 400 is a server which is managed by a power provider who provides an infrastructure such as the power grid 110. The power provider server 400 transmits a power reduction request for reducing the power consumption amount (stream amount) to the power management server 200 in order to stabilize a power source and demand balance. The power provider server 400 may also be referred to as a power provider DRAS. The power reduction request may also be referred to as a DR request.

In response to the power reduction request from the power provider server 400, the power management server 200 transmits the power reduction request to the facility 300 selected from among the plurality of facilities 300. In response to the power reduction request from the power management server 200, the local control apparatus 330 of the facility 300 selected by the power management server 200 controls a control target equipment (the load 310 and/or the distributed power supply 320) to reduce the power consumption amount (stream amount). The power consumption amount is reduced by stopping or suppressing the operation of the load 310. The power consumption amount may be reduced by outputting power from the distributed power supply 320.

In the first embodiment, the communication between the power management server 200 and the power provider server 400 and the communication between the power management server 200 and the local control apparatus 330 are performed in accordance with a first protocol. On the other hand, the communication between the local control apparatus 330 and the equipment (the load 310 or the distributed power supply 320) is performed in accordance with a second protocol different from the first protocol. As the first protocol, for example, a protocol in conformity with Open ADR (Automated Demand Response) or a dedicated independent protocol may be employed. The second protocol may employ, for example, a protocol in conformity with ECHONET Lite, SEP (Smart Energy Profile) 2.0, KNX, or a dedicated independent protocol. The power management server 200 may communicate with the equipment (the load 310 or the distributed power supply 320) using the first protocol. In this case, the power management server 200 can directly control the equipment without interposing the local control apparatus 330.

Figure 2:
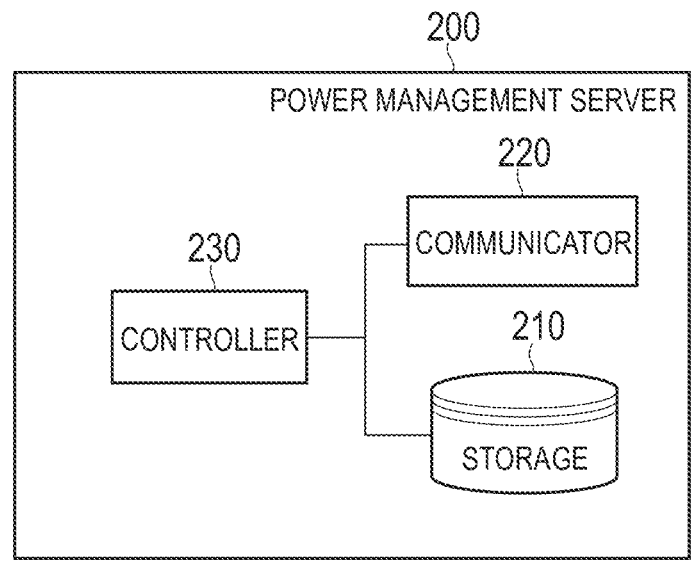
FIG. 2 is a diagram illustrating a configuration of a power management server according to the first to third embodiments.

The configuration of the power management server 200 according to the first embodiment will be described. As illustrated in FIG. 2, the power management server 200 includes a storage 210, a communicator 220, and a controller 230. The storage 210 is configured by a storage medium such as a nonvolatile memory and/or an HDD (Hard Disk Drive). The storage 210 stores information to be used in process and control of the controller 230. The communicator 220 is configured by a communication module. The communicator 220 communicates with the power management server 200 and the local control apparatus 330 through the network 120. The controller 230 is configured by a CPU (Central Processing Unit). The controller 230 controls each configuration installed in the power management server 200. The controller 230 performs various processes and controls described below.

Figure 3:
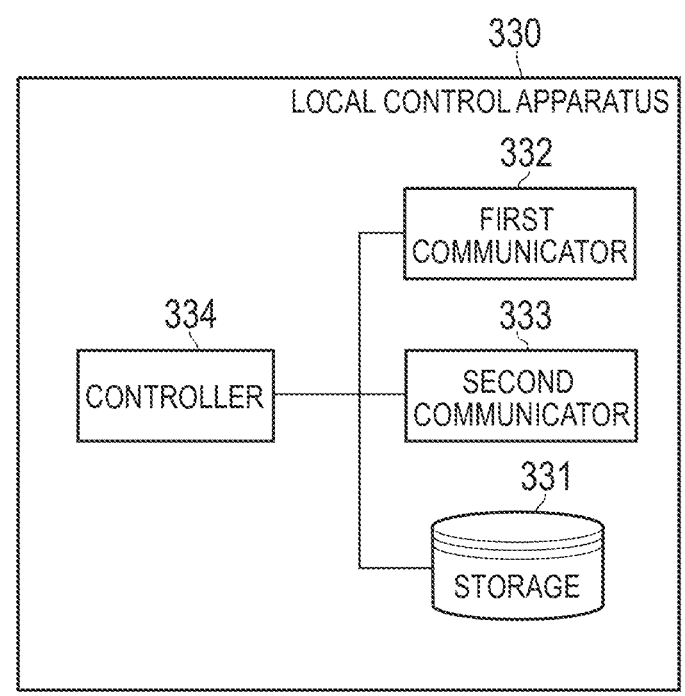
FIG. 3 is a diagram illustrating a configuration of a local control apparatus according to the first to third embodiments.

The configuration of the local control apparatus 330 according to the first embodiment will be described. As illustrated in FIG. 3, the local control apparatus 330 includes a storage 331, a first communicator 332, a second communicator 333, and a controller 334. The storage 331 stores information to be used in process and control of the controller 334. The first communicator 332 is configured by a communication module, and communicates with the power management server 200 through the network 120. The second communicator 333 is configured by a communication module, and communicates with the equipment (the load 310 and/or the distributed power supply 320). The controller 334 is configured by a CPU. The controller 334 controls every configuration installed in the local control apparatus 330. The controller 334 performs various processes and controls described below.

(Management Method)

A management method according to the first embodiment will be described.

Figure 4:
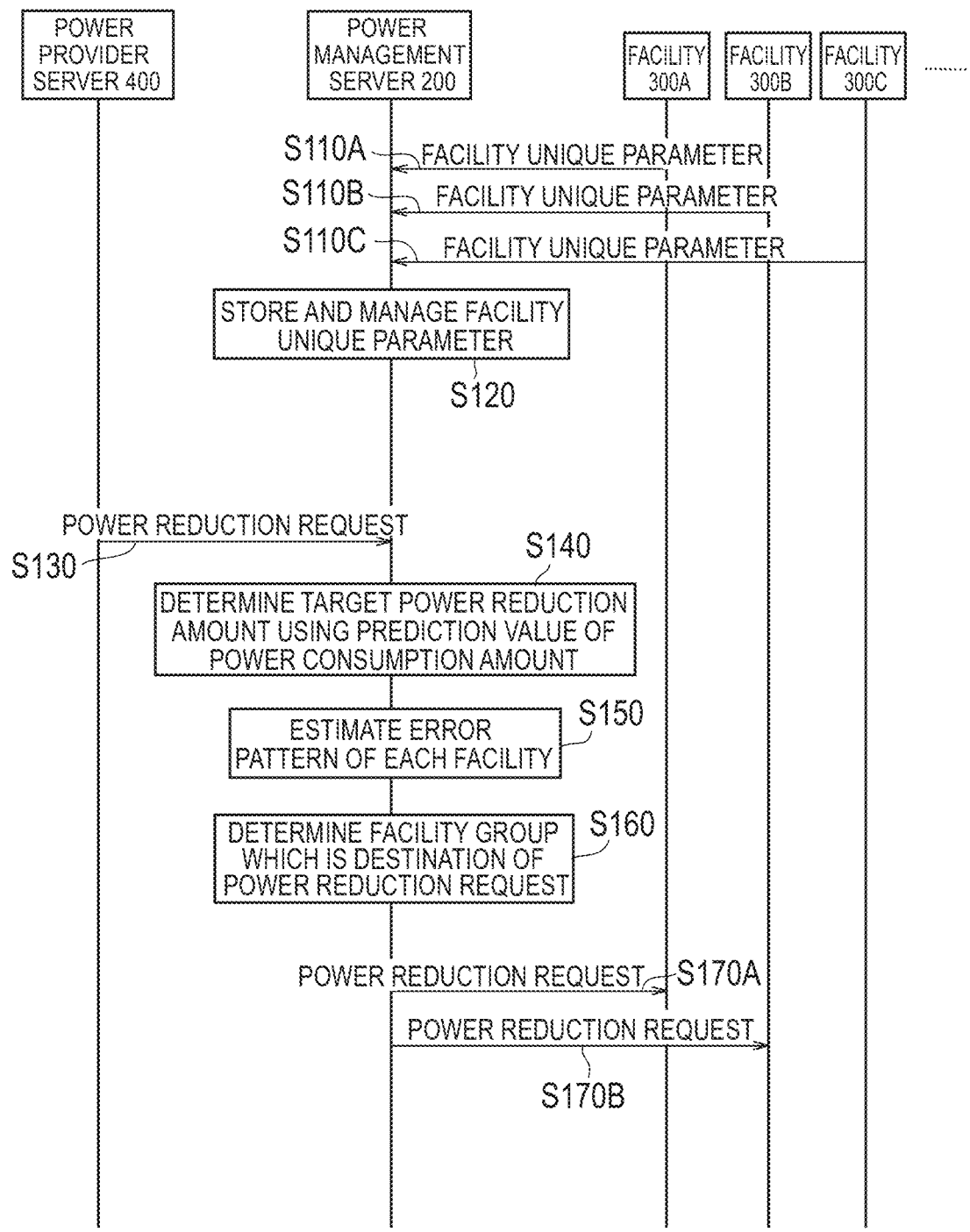
FIG. 4 is a diagram illustrating a management method according to the first embodiment.

As illustrated in FIG. 4, in Step S110, the power management server 200 receives a facility unique parameter from each facility 300. Specifically, the power management server 200 receives the facility unique parameter of the facility 300A from the local control apparatus 330 of the facility 300A (Step S110A), the facility unique parameter of the facility 300B from the local control apparatus 330 of the facility 300B (Step S110B), and the facility unique parameter of the facility 300C from the local control apparatus 330 of the facility 300C (Step S110C).

The facility unique parameter transmitted from the facility 300 to the power management server 200 includes at least one of a usage or a business type of the facility 300, a configuration of an equipment installed in the facility 300, a location of the facility 300, details of a space occupied by the facility 300, an operation schedule in the facility 300, a control algorithm to be used in control of the equipment installed in the facility 300, and an average power consumption amount of the facility 300. The average power consumption amount of the facility 300 may be realized by a power capacity (contract power) which is determined by a contract between the facility 300 (consumer's facility) and the power provider.

The local control apparatus 330 of the facility 300 may transmit the facility unique parameter of the facility 300 to the power management server 200 at the time of registering the facility 300 to the power management server 200. The local control apparatus 330 of the facility 300 may transmit the facility unique parameter to the power management server 200 when received a request from the power management server 200. The local control apparatus 330 of the facility 300 may transmit the facility unique parameter (change information) to the power management server 200 when the facility unique parameter of the facility 300 is changed.

In Step S120, the power management server 200 stores the facility unique parameter received from each facility 300, and manages the facility unique parameter for each facility 300. In a case where the facility unique parameter of one facility 300 is insufficient, the power management server 200 may compensate an insufficient facility unique parameter using the facility unique parameter of another facility 300 (for example, the facility 300 of the same scale in the same region) similar to the one facility 300. In a case where the facilities 300 have different prediction algorithms to be used for predicting the power consumption amount, the power management server 200 may store and manage the prediction algorithm as one of the facility unique parameters.

In Step S130, the power management server 200 receives the power reduction request from the power provider server 400. Alternatively, the power management server 200 may receive the power reduction request from the server of an upper aggregator (see the third embodiment). The power reduction request may include at least one of a starting date of a power reduction period, a duration time of the power reduction period, and a requested power reduction amount. The power reduction period is determined by the starting date and the duration time. The requested power reduction amount may be expressed with an absolute value (for example, [kW]), or may be expressed with a relative value (for example, [%]). Alternatively, the power management server 200 may store in advance the requested power reduction amount (for example, DR contract capacity) which is determined in the contract between the aggregator and the power provider. A time difference between a timing of the power reduction request and a start timing of the power reduction, and the duration time of the power reduction may be determined in advance by a contract.

In Step S140, the power management server 200 determines a target power reduction amount using a prediction value of the power consumption amount of the facility 300 in the power reduction period. The target power reduction amount is determined as follows for example. Firstly, the power management server 200 calculates a base line (P1) of the power consumption amount in the power reduction period which is a future period. The base line is a power consumption amount predicted in a case where there is no power reduction request, and is calculated by a predetermined algorithm on the basis of a contract. The base line is defined as an average power consumption amount of a certain period before the starting time of the power reduction for example. A difference between the base line and an actual power consumption amount after power reduction may be defined as negawatt. As a successful condition of DR, the difference between the negawatt and the requested power reduction amount (the power reduction amount requested from the power provider) may fall within a predetermined range. Secondly, the power management server 200 calculates a target value (P2) of the power consumption amount after power reduction on the basis of the base line and the requested power reduction amount. Thirdly, the power management server 200 calculates the prediction value of the power consumption amount of the facility 300 (P3) in the power reduction period using the prediction algorithm in order to predict the power consumption amount with more accuracy than the base line. Fourthly, the power management server 200 calculates a difference between the prediction value (P3) of the power consumption amount and the target value (P2) of the power consumption amount after power reduction as the target power reduction amount (P4).

In Step S150, the power management server 200 estimates the error pattern related to the prediction error occurring in a case where the power consumption amount in the power reduction period (future period) is predicted for each facility 300. In the first embodiment, the power management server 200 estimates the error pattern of each facility 300 on the basis of each facility unique parameter of the facility 300. The error pattern includes that the prediction error becomes the positive error or the negative error, and the amplitude (absolute value) of the prediction error. For example, the prediction error is defined as "Prediction Value of Power consumption amount—Actual Power consumption amount (real value)" in the power reduction period. In a case where the prediction value of the power consumption amount is larger than the actual power consumption amount, the prediction error becomes a positive value (that is, a positive error). In a case where the prediction value of the power consumption amount is smaller than the actual power consumption amount, the prediction error becomes a negative value (that is, a negative error). In addition, the value (absolute value) of the prediction error becomes large as a gap between the prediction value of the power consumption amount and the actual power consumption amount. The breakdown of an estimation process (Step S150) of the error pattern will be described below. The estimation process (Step S150) of the error pattern may be performed before Step S140.

Figure 5:
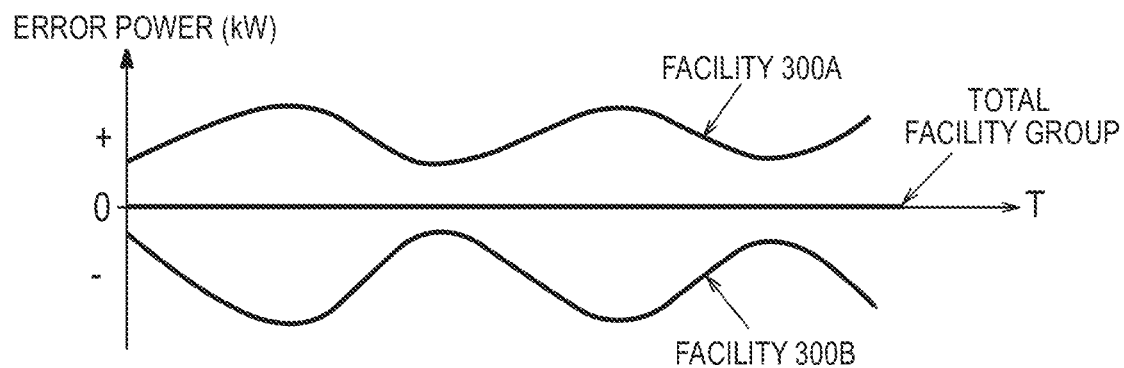
FIG. 5 is a diagram illustrating an example of grouping of facilities according to the first embodiment.

In Step S160, the power management server 200 determines a facility group of the facilities 300 which are the destination of the power reduction request from among the plurality of facility 300 on the basis of the error pattern of each facility 300. The power management server 200 combines a facility of which the prediction error is estimated to be the positive error and a facility of which the prediction error is estimated to be the negative error so as to determine the facility group such that the total prediction error of the facility group is minimized. For example, as illustrated in FIG. 5, it is assumed that there are the facility 300A of which the prediction error becomes a positive (+) error and the facility 300B of which the prediction error becomes a negative (−) error. In this case, the facility 300A and the facility 300B are put in a group to weaken the prediction error of the facility 300A and the prediction error of the facility 300B. In FIG. 5, the absolute values of the prediction error of the facility 300A and the prediction error of the facility 300B are similar to each other. The total prediction error of the facility group of the facilities 300A and 300B becomes close to zero.

In addition, in Step S160, the power management server 200 determines the facility group further on the basis of the power reduction amount of each facility 300 such that a total possible power reduction amount of the facility group becomes equal to or more than the target power reduction amount and the total prediction error of the facility group is minimized. In other words, the power management server 200 selects the facility 300 of the facility group to satisfy the following two conditions.

The total possible power reduction amount of the facility group becomes equal to or more than the target power reduction amount.

The total prediction error of the facility group is minimized.

Figure 6:
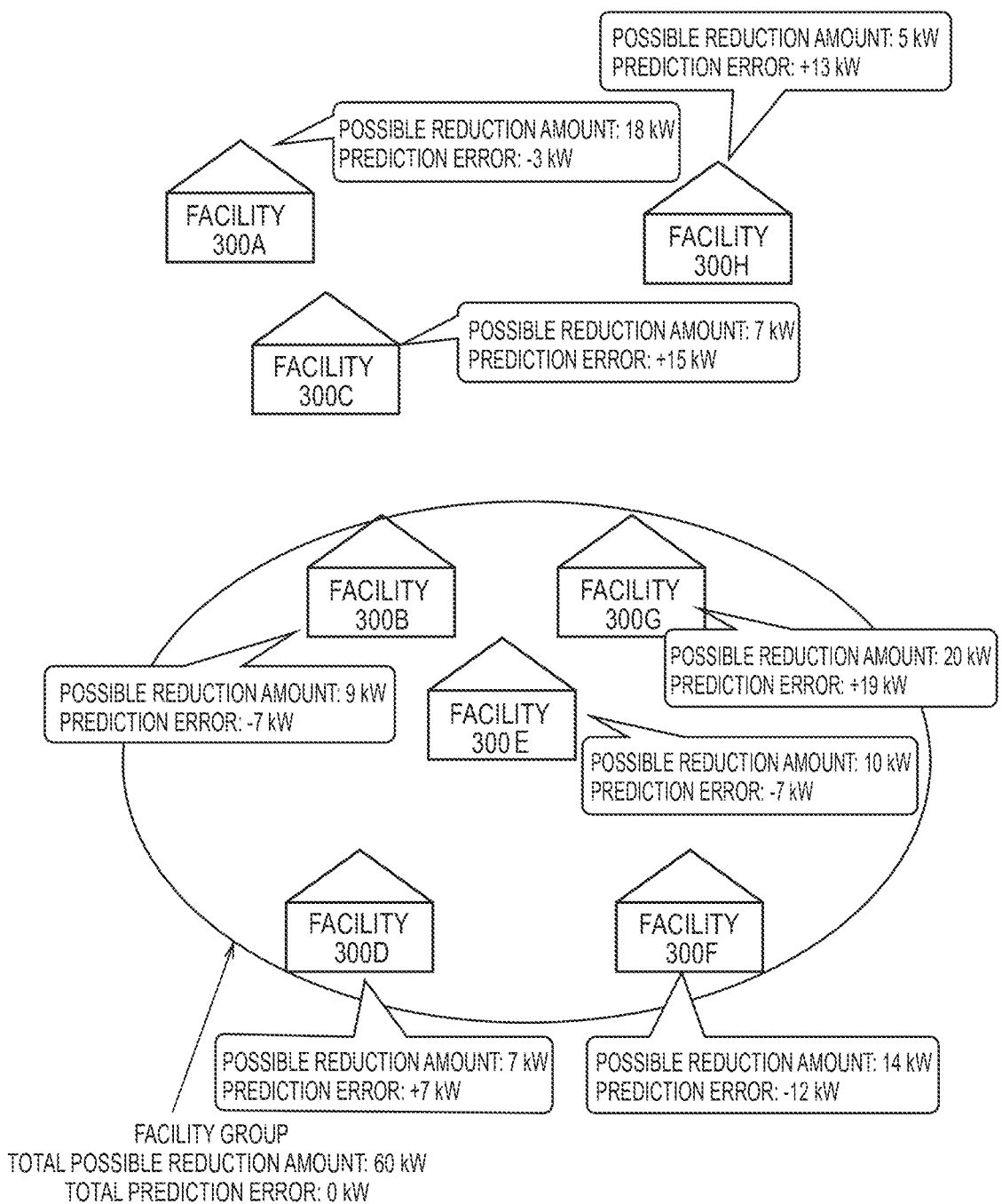
FIG. 6 is a diagram illustrating another example of grouping of facilities according to the first embodiment.

For example, as illustrated in FIG. 6, it is assumed that the power management server 200 manages the facilities 300A to 300H, and the target power reduction amount is 60 [kW]. The power management server 200 estimates the prediction error of each facility 300, and grasps the possible power reduction amount of each facility 300. The power management server 200 determines a facility group which is configured by the facility 300B, the facility 300D, the facility 300E, the facility 300F, and the facility 300G. The facility group has a total possible power reduction amount of 60 [kW]. In addition, the facility group contains a total positive prediction error of +26 [kW], and a total negative prediction error of −26 [kW]. Therefore, the positive prediction error and the negative prediction error are cancelled, so that the total prediction error of the facility group becomes zero.

The possible power reduction amount of the facility 300 may be determined by a contract between the facility 300 (consumer's facility) and the aggregator. The power management server 200 may determine the possible power reduction amount of the facility 300 on the basis of the estimated error pattern. For example, the power management server 200 may determine to reduce the possible power reduction amount of the facility 300 of which the prediction error is estimated as larger than a predetermined value. The power management server 200 may differently set the possible power reduction amount to the facility 300 providing the facility unique parameter to the power management server 200 and the facility 300 not providing the facility unique parameter to the power management server 200. For example, the power management server 200 may determine that the possible power reduction amount of the facility 300 not providing the facility unique parameter to the power management server 200 is small. In a case where the power reduction is performed by stopping the operation of the load 310 as the control target equipment, the power management server 200 may determine the possible power reduction amount further on the basis of the last power consumption amount of the load 310. In a case where the power reduction is performed by outputting power from the distributed power supply 320 as the control target equipment, the power management server 200 may determine the possible power reduction amount further on the basis of a rated output of the distributed power supply 320.

After determining the facility group, in Step S170, the power management server 200 transmits the power reduction request to each facility 300 in the determined facility group. For example, the power management server 200 transmits the power reduction request to the facility 300A (Step S170A), and transmits the power reduction request to the facility 300B (Step S170B). The power reduction request transmitted from the power management server 200 to the facility 300 may include at least one of the starting date of the power reduction period, the duration time of the power reduction period, and the requested power reduction amount. The local control apparatus 330 of the facility 300 received the power reduction request performs the power reduction using the control target equipment in the power reduction period.

After starting the power reduction period, the power management server 200 may perform the control on each facility 300 in the facility group. For example, the power management server 200 may control each facility 300 in the facility group such that the total power reduction amount of the facility group becomes the target power reduction amount on the basis of information (for example, power consumption amount) fed back from each facility 300 in the facility group in the power reduction period. In such a control, the power management server 200 may predict the power consumption amount of each facility 300 in the facility group using the prediction algorithm, and performs control (that is, prediction control) using the prediction value.

The power management server 200 may performs power reduction control other than the DR on each facility 300 using the control algorithm. For example, the power management server 200 performs OFF control of the load 310 such as an air conditioner in a predetermined time zone. In a case where such a power reduction control is performed, the power management server 200 may change a control pattern with respect to each facility 300 in facility group. For example, the load 310 is adjusted to be turned off in a time zone when the facility 300 in the facility group is different. With this configuration, it is possible to reduce a phenomenon that the prediction error becomes large in a specific time zone.

Next, the breakdown of the estimation process (Step S150) of the error pattern will be described.

Figure 7:
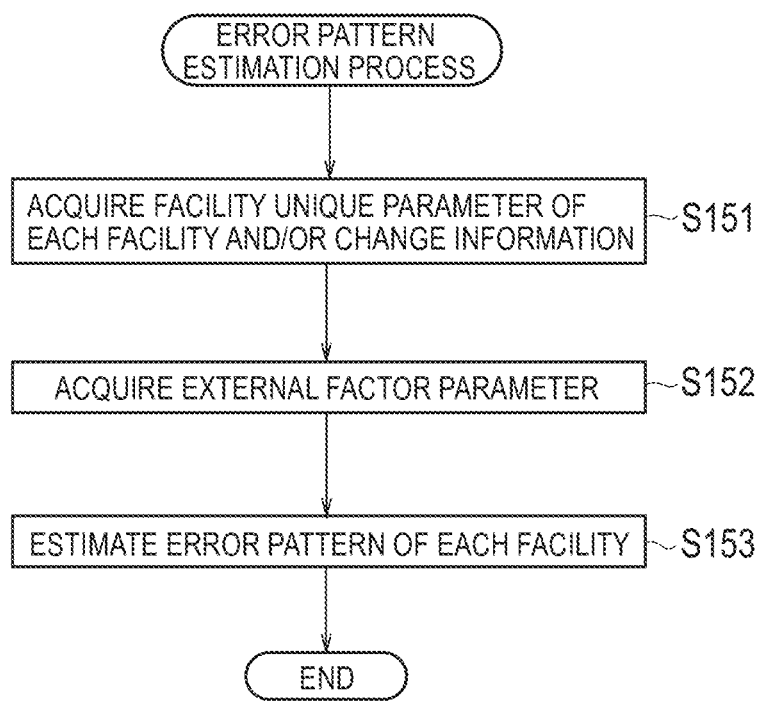
FIG. 7 is a diagram illustrating an estimation process of an error pattern according to the first embodiment.

As illustrated in FIG. 7, in Step S151, the power management server 200 acquires the facility unique parameter of each facility 300 and/or the change information of the facility unique parameter. Specifically, the controller 230 of the power management server 200 reads the facility unique parameter (and the change information) stored in the storage 210 in Step S120. The facility unique parameter includes at least one of the usage or the business type of the facility, a configuration of the equipment installed in the facility, the location of the facility, the breakdown of the space occupied by the facility, the operation schedule in the facility, the control algorithm used in the control of the equipment installed in the facility, the prediction algorithm to be used in the prediction of the power consumption amount of the facility, and the average power consumption amount of the facility.

In Step S152, the power management server 200 acquires an external factor parameter which affects the prediction error. The external factor parameter is a parameter related to the power reduction period and, for example, includes at least one of a weather condition, seasons, day of the week, and a time zone. The weather condition may include a climate and a temperature. The power management server 200 may acquire the weather condition from a server (not illustrated) which distributes weather information. Step S152 may be performed prior to Step S151. In addition, Step S152 is not essential, and thus may be omitted.

In Step S153, the power management server 200 estimates the error pattern in each facility 300 on the basis of the facility unique parameter and/or the change information. The power management server 200 may estimate the error pattern further on the basis of the external factor parameter.

In the following, the description will be given about a specific example of an estimation rule used when the power management server 200 estimates the error pattern.

(1) Usage or Business Type of Facility

The usage or the business type of the facility is, for example, a house, a store, a company (office), school, and a data center. These information may be finely divided.

For example, it is assumed a time zone of daytime on weekdays in a case where day of the week and a time zone are used as the external factor parameter. The company and the school have a tendency that the power consumption amount is increased as the users are increased. On the other hand, a department store has a tendency that the power consumption amount is decreased as the users are decreased. Therefore, as for a time zone of daytime on weekdays, the power management server 200 estimates that the company and the prediction error of the school will be a negative error (that is, the actual power consumption amount is increased with respect to the prediction value). In a time zone of daytime on weekdays, the power management server 200 estimates that the prediction error of the department store will be a positive error (that is, the actual power consumption amount is lowered with respect to the prediction value).

In addition, it is assumed a scenario that the temperature is increased during the winter in a case where seasons and the weather condition (temperature) are used as the external factor parameter. Since the data center uses an air conditioner even in the winter, the power consumption amount tends to increase. On the other hand, since a house, a store, and an office do not use an air conditioner in the winter, and the use of a heater is decreased, the power consumption amount tends to reduced. Therefore, in a case where the temperature is increased in the winter, the power management server 200 estimates that the prediction error of the data center becomes a negative error, and the prediction errors of a house, a store, and an office become a positive error.

(2) Configuration of Equipment Installed in Facility

The configuration of the equipment installed in the facility includes a type and a specification of the equipment. For example, a show case installed in a supermarket is assumed. In a case where the show case is a reach-in type (with door), an influence of the environment in the store affecting the temperature in the show case is small. Therefore, the power consumption amount also tends to vary small. On the other hand, in a case where the show case is not a reach-in type, the influence of the environment in the store affecting the temperature in the show case is large. Therefore, the power consumption amount tends to vary large. Therefore, the power management server 200 estimates that the prediction error is small in the supermarket of which the show case is a reach-in type, and the prediction error of the supermarket of which the show case is not a reach-in type becomes large.

(3) Location of Facility

For example, it is assumed a scenario of raining in a case where a weather condition is used as the external factor parameter. A store near a station has a tendency that the power consumption amount is increased as the users are increased. On the other hand, the store near the station has a tendency that the power consumption amount is decreased as the users are decreased. Therefore, in a case where it is raining, the power management server 200 estimates that the prediction error of a store near a station becomes a negative error, and the prediction error of a store away from a station becomes a positive error.

(4) Details of Space Occupied by Facility

The breakdown of the space occupied by the facility include a parking lot in a store, a size of the parking lot, and an eating area in a store.

For example, it is assumed a scenario of raining in a case where a weather condition is used as the external factor parameter. A store having a wide parking lot has a tendency that the power consumption amount is increased as the users are increased. On the other hand, a store having a narrow parking lot or none has a tendency that the power consumption amount is reduced as the users are decreased. Therefore, in a case where it is raining, the power management server 200 estimates that the prediction error of a store having a wide parking lot becomes a negative error, and a store having a narrow parking lot or none becomes a positive error.

In addition, it is assumed a time zone of lunch time and dinner time in a case where the time zone is used as the external factor parameter. A store having an eating area has a tendency that the power consumption amount is increased as the users are increased. On the other hand, a store having no eating area has a tendency that the power consumption amount is reduced as the users are decreased. Therefore, as for a time zone of lunch time and dinner time, the power management server 200 estimates that the prediction error of a store having an eating area becomes a negative error, and the prediction error of a store having no eating area becomes a positive error.

(5) Operation Schedule in Facility

For example, it is assumed a time zone of from 16:00 to 16:59 in a case where the time zone is used as the external factor parameter. A store starting business from 16:00 has a tendency that the power consumption amount is increased as the users are increased. On the other hand, a store closing business at 16:00 has a tendency that the power consumption amount is reduced as the users are decreased. Therefore, as for the time zone of from 16:00 to 16:59, the power management server 200 estimates that the prediction error of a store starting business from 16:00 becomes a negative error, and the prediction error of a store closing business at 16:00 becomes a positive error.

(6) Control Algorithm and Prediction Algorithm

The control algorithm relates to the type/content of the algorithm used in the power reduction control other than the DR and to whether the control is performed. For example, it is assumed a time zone of from 16:00 to 16:59 in a case where the time zone is used as the external factor parameter. The facility where the air conditioner is controlled to be switched from off to on at 16:00 has a tendency that the power consumption amount is increased. On the other hand, the facility where the air conditioner is controlled to be switched from on to off at 16:00 has a tendency that the power consumption amount is reduced. Therefore, as for a time zone of from 16:00 to 16:59, the power management server 200 estimates that the prediction error of the facility where the air conditioner is controlled to be switched from off to on at 16:00 becomes a negative error, and the prediction error of the facility where the air conditioner is controlled to be switched from on to off at 16:00 becomes a positive error.

The prediction algorithm relates to the type/content of the algorithm to predict a value at another time point using a parameter at a certain time point. For example, it is assumed that the data of the power consumption amount used in predicting the power consumption amount is data of the time zone where the control of the control algorithm is performed. In this case, if estimating the power consumption amount of the time zone where the control of the control algorithm is not performed, the actual power consumption amount tends to be larger than the prediction value. Therefore, in such a case, the power management server 200 estimates that the prediction error becomes a negative error. On the other hand, it is assumed that the data of the power consumption amount to be used in predicting the power consumption amount is data of the time zone where the control of the control algorithm is not performed. In this case, if predicting the power consumption amount of the time zone where the control of the control algorithm is performed, the actual power consumption amount tends to be smaller than the prediction value. Therefore, in such a case, the power management server 200 estimates that the prediction error becomes a positive error.

In addition, the types of the prediction algorithm include a first prediction algorithm where a linear prediction is performed from the data of the last power consumption amount, and a second prediction algorithm where an average value of the power consumption amount of the same time zone in the past is used. For example, in a specific example of "(5) the operation schedule in the facility", the prediction error is considered as small in a case where the power consumption amount is predicted by the second prediction algorithm. Therefore, the power management server 200 may estimate a magnitude of the prediction error according to the type of the prediction algorithm.

(7) Average Power Consumption Amount of Facility (Contract Power)

The prediction error tends to be large as the average power consumption amount (contract power) of the facility (that is, the scale of the facility) is increased. Therefore, the power management server 200 estimates the magnitude of the prediction error according to the average power consumption amount (contract power) of the facility.

(8) Change Information

For example, it is assumed that the operation schedule in a store is changed and a time of adding work of a product is changed. The power consumption amount of a show case (cold case) is increased at the time of adding a product. Therefore, as for the time zone when a work of adding a product is performed due to a change in the operation schedule, the actual power consumption amount tends to be larger than the prediction value of the power consumption amount. Therefore, in such a case, the power management server 200 estimates that the prediction error becomes a negative error. On the other hand, as for the time zone when a work of adding a product is not performed due to a change in the operation schedule, the actual power consumption amount tends to be smaller than the prediction value of the power consumption amount. Therefore, in such a case, the power management server 200 estimates that the prediction error becomes a positive error.

In addition, it is assumed a case where the contract power of the facility is changed. In a case where the contract power of the facility is changed, the power consumption amount of the facility is also considered to be changed, and thus the magnitude of the prediction error is affected. Therefore, in a case where the contract power of the facility is changed to be large, the power management server 200 estimates that the prediction error is increased. On the other hand, in a case where the contract power of the facility is changed to be small, the power management server 200 estimates that the prediction error becomes small.

Second Embodiment

A management method according to the second embodiment will be described mainly on the configurations different from the first embodiment. In the second embodiment, the power management server 200 acquires statistical information based on the prediction error in the past of each facility 300, and estimates the error pattern of each facility 300 on the basis of the statistical information.

Figure 8:
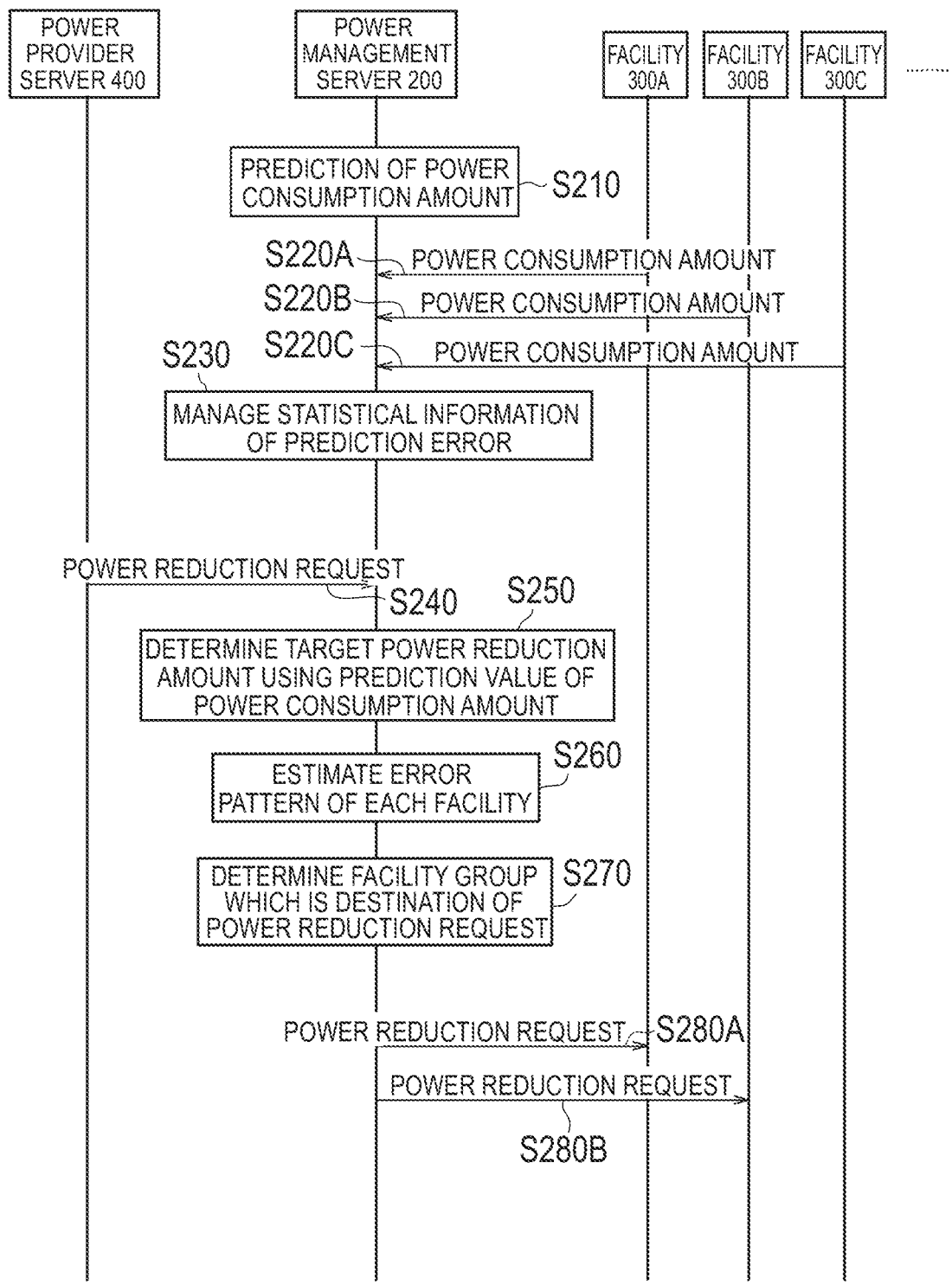
FIG. 8 is a diagram illustrating a management method according to the second embodiment.

As illustrated in FIG. 8, in Step S210, the power management server 200 predicts the power consumption amount of each facility 300 using the prediction algorithm. The power management server 200 may predict the power consumption amount using a prediction algorithm different for each facility 300.

In Step S220, the power management server 200 receives the actual power consumption amount (measurement value) from each facility 300.

In Step S230, the power management server 200 calculates the prediction error on the basis of the prediction value of the power consumption amount and the actual power consumption amount, and stores and manages the prediction error. The power management server 200 repeatedly performs the processes of Steps S210 to S230 to perform a statistical process of the prediction error, and calculates the statistical information of the prediction error. The statistical information of the prediction error includes the error pattern of the prediction error and the prediction accuracy.

The power management server 200 associates the facility, the external factor parameter, and the type of the prediction algorithm, and manages of the statistical information of the prediction error. The external factor parameter includes, for example, at least one of a weather condition, seasons, day of the week, and a time zone. The power management server 200 may also manage the statistical information of the prediction error in association with the facility unique parameter. As the type of the prediction algorithm, there are the first prediction algorithm where the linear prediction is performed from the data of the last power consumption amount, the second prediction algorithm where the average value of the power consumption amount of the same time zone in the past is used, and a third prediction algorithm where the power consumption amount is predicted from a weather forecast on the basis of the statistical information indicating a relation between the weather condition (climate) and the power consumption amount. For example, the first prediction algorithm has a tendency that the prediction value is lowered in the time zone when the power consumption amount is steeply increased, and a negative prediction error is generated. In a case where a new equipment is introduced to the facility, the second prediction algorithm has a tendency that the actual power consumption amount is increased rather than the power consumption amount in the past and the prediction value is lowered to generate a negative prediction error. In a case where the weather forecast is cloudy but actually clear, the third prediction algorithm has a tendency that the power consumption amount is increased due to the increase in temperature or the power consumption amount is reduced due to the increase in power generation of the solar cell.

The processes of Steps S240 and S250 are similar to those of the first embodiment.

In Step S260, the power management server 200 estimates the error pattern of each facility 300. In the second embodiment, the power management server 200 estimates the error pattern of each facility 300 on the basis of the statistical information based on the prediction error in the past. The breakdown of an estimation process (Step S260) of the error pattern will be described below. Step S260 may be performed prior to Step S250.

The processes of Steps S270 and S280 are similar to those of the first embodiment.

Next, the breakdown of the estimation process (Step S260) of the error pattern will be described.

Figure 9:
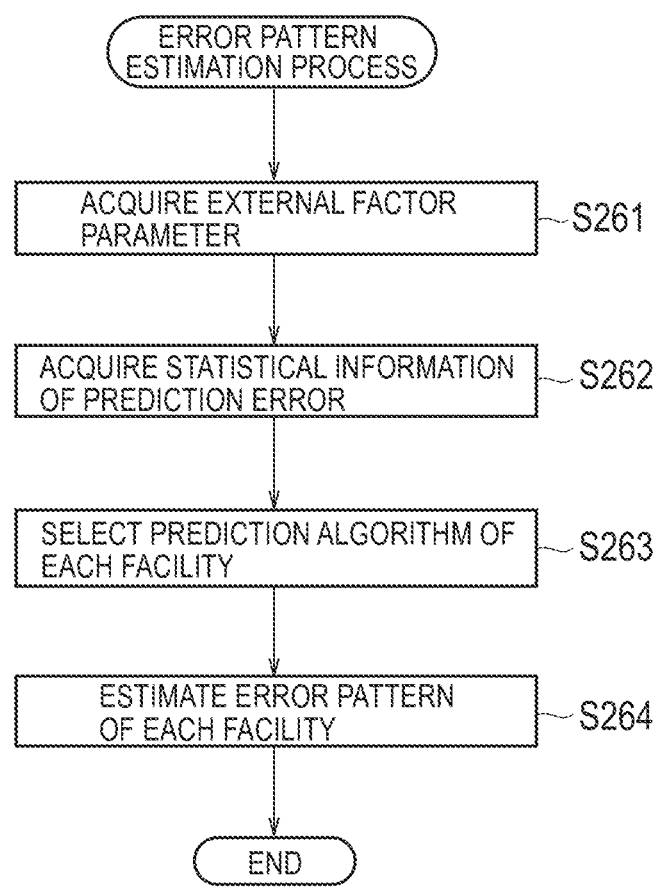
FIG. 9 is a diagram illustrating an estimation process of an error pattern according to the second embodiment.

As illustrated in FIG. 9, in Step S261, the power management server 200 acquires the external factor parameter related to the power reduction period.

In Step S262, the power management server 200 acquires the statistical information associated with the acquired external factor parameter on the basis of the statistical information of the prediction error managed in Step S230 and the external factor parameter acquired in Step S261.

In Step S263, the power management server 200 selects a prediction algorithm of the highest prediction accuracy for each facility 300 on the basis of the statistical information acquired in Step S262.

In Step S264, the power management server 200 estimates the error pattern of each facility 300 on the basis of the prediction algorithm selected in Step S264 and the statistical information.

[Modification of Second Embodiment]

In the second embodiment, the power management server 200 may manage the statistical information of the prediction error associated with the facility unique parameter (particularly, the operation schedule and the control algorithm). The power management server 200 may determine the operation schedule and/or the control algorithm in which the prediction error is minimized on the basis of the managed statistical information, and inform the operation schedule and/or the control algorithm thus determined to the facility 300. In a case where the operation schedule and/or the control algorithm are changed according to the notification from the power management server 200, the local control apparatus 330 of the facility 300 may notify the power management server 200 of the above matter.

Third Embodiment

The third embodiment will be described mainly on the configurations different from the first and second embodiments.

(Power Management System)

Figure 10:
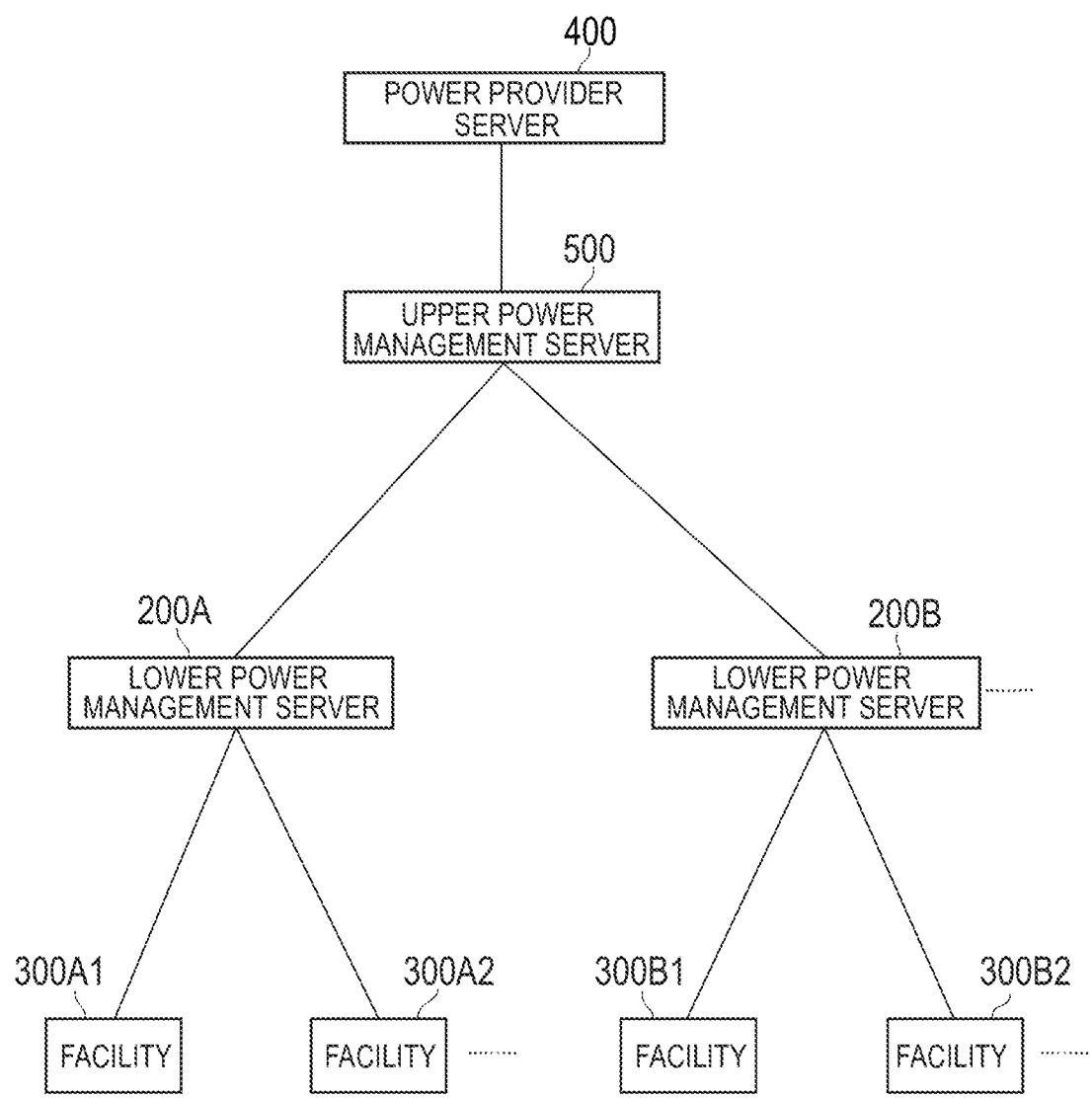
FIG. 10 is a diagram illustrating a configuration of a power management system according to the third embodiment.

The configuration of a power management system according to the third embodiment will be described. As illustrated in FIG. 10, the power management system according to the third embodiment has a hierarchical configuration of the power management server. Specifically, the power management system includes a plurality of lower power management servers 200 (200A, 200B, . . . ), and an upper power management server 500 which manages the plurality of lower power management servers 200. The lower power management server 200A manages the plurality of facilities 300A (300A1, 300A2, . . . ). The lower power management server 200B manages the plurality of facilities 300B (300B1, 300B2, . . . ).

The lower power management server 200 is a server which is managed by a lower aggregator. The lower aggregator is a company which collects power reduction amounts from a bundle of the plurality of facilities 300. In the third embodiment, the lower power management server 200 is an example of the lower management apparatus which manages the plurality of facilities 300.

The upper power management server 500 is a server which is managed by an upper aggregator. The upper aggregator is a company which collects the power reduction amounts from a bundle of a plurality of lower aggregators (the plurality of lower power management servers 200). In the third embodiment, the upper power management server 500 is an example of an upper power management server which manages the plurality of lower management apparatuses. The hardware configuration of the upper power management server 500 is similar to that of the lower power management server 200 (see FIG. 2). The upper power management server 500 may be shared with the power provider server 400. In this case, the upper power management server 500 may be managed by the power provider who provides an infrastructure such as the power grid.

In response to the power reduction request from the power provider server 400, the upper power management server 500 transmits the power reduction request to the lower power management server 200 (lower power management server group) which is selected from among the plurality of lower power management servers 200.

The lower power management server 200 selected by the upper power management server 500 receives the power reduction request from the upper power management server 500, and transmits the power reduction request to the facility 300 selected from among the plurality of facilities 300 under control of the lower power management server. The operation of the lower power management server 200 to determine a facility group is similar to that of the first or second embodiment.

(Management Method)

A management method according to the third embodiment will be described.

In the first and second embodiments, the description has been given about a method of weakening the prediction error among the facilities by grouping the facilities 300 so as to minimize the total prediction error of the facility group. However, there is a possibility that the prediction error may not be canceled among the facilities depending on the number and/or the error pattern of the facilities 300 managed by one lower power management server 200. Thus, in the third embodiment, the total prediction error is weakened among the lower power management servers by grouping the lower power management servers 200 so as to minimize the total prediction error of the lower power management server group.

As illustrated in FIG. 11, in Step S310, the upper power management server 500 receives prediction error statistical information from each lower power management server 200. Specifically, the upper power management server 500 receives the prediction error statistical information of the lower power management server 200A from the lower power management server 200A (Step S310A), the prediction error statistical information of the lower power management server 200B from the lower power management server 200B (Step S310B), and the prediction error statistical information of the lower power management server 200C from a lower power management server 200C (Step S310C).

The prediction error statistical information is information which is calculated by the lower power management server 200 through the statistical process on the basis of the prediction error in the past. The prediction error statistical information may include an upper fluctuation amount and a lower fluctuation amount. The upper fluctuation amount is a prediction value indicating a certain degree of upper fluctuation in a case where the actual power consumption amount fluctuates over the prediction value of the power consumption amount. The lower fluctuation amount is a prediction value indicating a certain degree of lower fluctuation in a case where the actual power consumption amount fluctuates under the prediction value of the power consumption amount. The prediction error statistical information may include a prediction error range and a prediction error center. The prediction error range is a prediction value indicating a deviation width of the actual power consumption amount with respect to the prediction value of the power consumption amount. The prediction error center is a value indicating the center of the prediction error range.

Table 1 illustrates an example of transferring the upper fluctuation amount and the lower fluctuation amount using a message in conformity with Open ADR.

The lower power management server 200 may periodically transmit the prediction error statistical information to the upper power management server 500. When there is a request from the upper power management server 500, the lower power management server 200 may transmit the prediction error statistical information to the upper power management server 500. The upper power management server 500 stores the prediction error statistical information received from each lower power management server 200, and manages the prediction error statistical information for each lower power management server 200.

In Step S320, the upper power management server 500 receives the power reduction request from the power provider server 400.

In Step S330, the upper power management server 500 estimates the error pattern for each lower power management server 200 on the basis of the prediction error statistical information received in Step S310. The error pattern includes that the prediction error becomes the positive error or the negative error, and the amplitude (absolute value) of the prediction error.

In Step S340, the upper power management server 500 determines the lower power management server group of the lower power management servers 200 which are a destination of the power reduction request from among the plurality of lower power management servers 200 on the basis of the error pattern of each lower power management server 200. The upper power management server 500 combines a lower power management server of which the prediction error is estimated to be a positive error and a lower power management server of which the prediction error is estimated to be a negative error so as to determine the lower power management server such that the total prediction error of the lower power management server groups is minimized. The upper power management server 500 may determine the lower power management server group further on the basis of the possible power reduction amount of each lower power management server 200 such that the total possible power reduction amount of the lower power management server group becomes equal to or more than the requested power reduction amount, and the total prediction error of the lower power management server group is minimized.

After determining the lower power management server group, in Step S350, the upper power management server 500 transmits the power reduction request to each lower power management server 200 in the determined lower power management server group. For example, the upper power management server 500 transmits the power reduction request to the lower power management server 200A (Step S350A), and transmits the power reduction request to the lower power management server 200B (Step S350B). The lower power management server 200 received the power reduction request determines a facility group by a method similar to that of the first embodiment or the second embodiment.

TABLE 1

| TRANSMISSION ITEM | reportName | reportType | UNIT | readingType |
|---|---|---|---|---|
| UPPER FLUCTUATION AMOUNT | USER DEFINITION x-upperUsageProjected | POWER CONSUMPTION AMOUNT usage | Wh | PREDICTION VALUE Projected |
| LOWER FLUCTUATION AMOUNT | USER DEFINITION x-lowerUsageProjected | POWER CONSUMPTION AMOUNT usage | Wh | PREDICTION VALUE Projected |

[Modification of Third Embodiment]

The sequence illustrated in FIG. 11 may be changed as follows.

In response to the power reduction request from the power provider server 400, the upper power management server 500 temporarily groups the lower power management server 200, determines a temporary lower power management server group, and transmits the power reduction request to each lower power management server 200 in the temporary lower power management server group.

In response to the power reduction request from the upper power management server 500, the lower power management server 200 determines the facility group on which the grouping of the facilities 300 is performed. The lower power management server 200 calculates a residual error in the total prediction error of the determined facility group, and transmits the information indicating the calculated residual error as the prediction error statistical information to the upper power management server 500. In response to a request from the upper power management server 500, the lower power management server 200 may transmit the prediction error statistical information to the upper power management server 500.

The upper power management server 500 receives the prediction error statistical information (information indicating the residual error) from each lower power management server 200 in the temporary lower power management server group, performs re-grouping of the lower power management servers 200 on the basis of the received prediction error statistical information, and updates the power reduction request for the lower power management server 200.

Other Embodiments

The present disclosure has been described using the embodiments. However, the descriptions and the drawings forming part of this disclosure should not be considered as limiting the invention. This disclosure will reveal to a person skilled in the art a variety of alternative embodiments, examples, and operational techniques.

In the first embodiment, the description has been given about a specific example of an estimation rule used when the power management server 200 estimates the error pattern. The power management server 200 may add and/or change an estimation rule of the error pattern on the basis of the statistical information as described in the second embodiment.

In the first to third embodiments, the description has been given about an example of determining an initial group before the power reduction period starts. However, in a case where the group is changed during the power reduction period, the re-grouping based on the error pattern may be performed.

The management methods according to the first to third embodiments may be provided with a program which is executed by a computer. In addition, the program may be stored in a computer-readable medium. With the use of the computer-readable medium, the program can be installed in the computer. Herein, the computer-readable medium with the program stored may be a non-fugitive recording medium. The non-fugitive recording medium is not particularly limited, and may be a recording medium such as a CD-ROM and a DVD-ROM.

Further, the content of Japanese Patent Application No. 2017-105971 (filed on May 29, 2017) is incorporated by reference herein in its entirety.

The invention claimed is:

1. A management method used in a management apparatus, the management apparatus managing a plurality of entities which use or manage power, wherein the management method comprises:

estimating, for each of the plurality of entities, an error pattern related to a prediction error occurring when a power consumption amount in a future period is predicted; and determining a group of entities from among the plurality of entities based on the error pattern, wherein the group is a destination of a power reduction request for reducing the power consumption amount, wherein the estimating the error pattern includes estimating whether the prediction error is a positive error or a negative error, and the determining the group of the entities includes determining the group such that a total prediction error of the group is minimized, by combining an entity of which the prediction error is estimated to be a positive error and an entity of which the prediction error is estimated to be a negative error.

2. The management method according to claim 1, further comprising:

transmitting the power reduction request to each entity in the group determined in the determining the group of the entities.

3. The management method according to claim 1, wherein the determining the group of the entities includes determining the group further based on a possible power reduction amount of each of the plurality of entities such that a total possible power reduction amount of the group is equal to or more than a target power reduction amount.

4. The management method according to claim 1, wherein each of the plurality of entities is a facility which uses power, the management apparatus manages a plurality of facilities as the plurality of entities, the estimating the error pattern includes estimating, for each of the plurality of facilities, the error pattern for each of the plurality of facilities, and the determining the group of the entities includes determining the group of facilities from among the plurality of facilities, wherein the group of facilities is a destination of the power reduction request.

5. The management method according to claim 4, wherein the estimating the error pattern includes:

acquiring, for each of the plurality of facilities, a facility unique parameter, wherein the facility unique parameter affects the prediction error; and estimating, for each of the plurality of facilities, the error pattern based on the facility unique parameter, wherein the facility unique parameter includes at least one of a usage or a business type of a corresponding facility, a configuration of an equipment which is installed in the corresponding facility, a location of the corresponding facility, breakdown of a space occupied by the corresponding facility, an operation schedule in the corresponding facility, a control algorithm to be used in control of an equipment installed in the corresponding facility, a prediction algorithm to be used in prediction of a power consumption amount of the corresponding facility, and an average power consumption amount of the corresponding facility.

6. The management method according to claim 5,
wherein the estimating the error pattern includes estimating, for each of the plurality of facilities, the error pattern based on the facility unique parameter and an external factor parameter, wherein the external factor parameter affects the prediction error, wherein
the external factor parameter includes at least one of a weather condition, seasons, day of the week, and a time zone.

7. The management method according to claim 5,
wherein the estimating the error pattern includes:
acquiring change information related to a change of the facility unique parameter; and
estimating, for a facility which is changed the facility unique parameter, the error pattern based on the change information.

8. The management method according to claim 4,
wherein the estimating the error pattern includes:
acquiring, for the plurality of facilities, statistical information based on a prediction error in the past; and
estimating, for each of the plurality of facilities, the error pattern based on the statistical information.

9. The management method according to claim 8,
wherein the estimating the error pattern includes:
selecting, for the plurality of facilities, a prediction algorithm based on the statistical information and an external factor parameter which affects the prediction error, wherein the external factor parameter affects the prediction error, and the prediction algorithm is used in prediction of the power consumption amount; and
estimating, for each of the plurality of facilities, the error pattern based on the selected prediction algorithm.

10. The management method according to claim 1,
wherein each of the plurality of entities is a lower management apparatus which manages a plurality of facilities which use power,
the management apparatus is an upper management apparatus which manages a plurality of lower management apparatuses,
the estimating the error pattern incudes estimating, for each of the plurality of lower management apparatuses, the error pattern, and
the determining the group of the entities includes determining the group of the lower management apparatuses from among the plurality of lower management apparatuses, wherein the group of the lower management apparatuses is a destination of the power reduction request.

11. The management method according to claim 10, comprising:
receiving, from each of the plurality of lower management apparatuses, prediction error statistical information for estimating the error pattern,
wherein the estimating the error pattern includes estimating, for each of the plurality of lower management apparatuses, the error pattern based on the received prediction error statistical information.

12. A management apparatus which manages a plurality of entities, the plurality of entities using or managing power, wherein the management apparatus comprises:
a controller configured to perform:
a process A of estimating, for each of the plurality of entities, an error pattern related to a prediction error occurring when a power consumption amount in a future period is predicted; and
a process B of determining a group of entities from among the plurality of entities based on the error pattern, wherein the group is a destination of a power reduction request for reducing the power consumption amount,
wherein the process A includes a process of estimating whether the prediction error is a positive error or a negative error, and
the process B includes a process of determining the group such that a total prediction error of the group is minimized, by combining an entity of which the prediction error is estimated to be a positive error and an entity of which the prediction error is estimated to be a negative error.

* * * * *